UNITED STATES PATENT OFFICE.

OTTO P. AMEND, OF NEW YORK, N. Y.

SOLVENT FOR PYROXYLINE.

SPECIFICATION forming part of Reissued Letters Patent No. 10,879, dated November 8, 1887.

Original No. 371,021, dated October 4, 1887. Application for reissue filed October 15, 1887. Serial No. 252,487.

*To all whom it may concern:*

Be it known that I, OTTO P. AMEND, a citizen of the United States, residing at New York, in the county and State of New York, have invented certain new and useful Improvements in Solvents for Pyroxyline or Nitro-Cellulose and the Process of Preparing the Same, of which the following is a specification.

In the processes of manufacture of pyroxyline now in use it is customary to effect its solution by means of camphor, together with some menstruum—such as alcohol; and it is also necessary to use heat and pressure to develop the solvent properties of these combined agents.

The object of my invention is to produce a solvent which will act upon pyroxyline directly without the presence of camphor and without the application of heat and pressure; and I have discovered that the liquid obtained by the action of free chlorine upon a mixture of amylic alcohol and acetic acid accomplishes this object.

To prepare this solvent I prefer to take a mixture of eight parts, by measure, of amylic alcohol and one part of acetic acid, and to treat these with free chlorine, and then remove the excess of chlorine by washing and filtering. The result of the operation is a mixture of chloracetates of amyl, which are solvents of pyroxyline. There are also some by-products; but as they do not interfere with the solvent action of the chloracetates of amyl it is not necessary to separate them, and the liquid may be used at once upon the removal of the excess of chlorine, as above described.

The product obtained by the above operation is a powerful direct solvent of pyroxyline, and may be substituted for all other solvents now in use, as it dissolves the pyroxyline rapidly without heat; and solutions of any consistency, from a thin liquid for use as a varnish or lacquer up to a stiff plastic mass suitable for molding or working into any desired form may be readily formed by simply adding the pyroxyline to the solvent and agitating or stirring the mixture. It may also be employed as a substitute for the mixture of ether and alcohol now in vogue in the collodion process. It may also be used in combination with camphor as a substitute for alcohol in the ordinary process of manufacture of pyroxyline, if desired.

As I have above stated, I prefer to use a mixture of eight parts of amylic alcohol and one of acetic acid for the preparation of a direct solvent, as I have found these proportions give the best results; but any proportions up to about one part of acetic acid to thirty-two parts of amylic alcohol may be employed with varying degrees of efficacy.

What I claim, and desire to secure by Letters Patent, is—

The solvent for pyroxyline herein described, composed of a mixture of chloride and the chloracetates of amyl, substantially as specified.

OTTO P. AMEND.

Witnesses:
WM. H. WOODHULL,
JOHN P. ARNETT.